June 10, 1930.  L. S. ROSENER  1,762,243
FESTOONING APPARATUS
Filed March 16, 1926    13 Sheets-Sheet 6
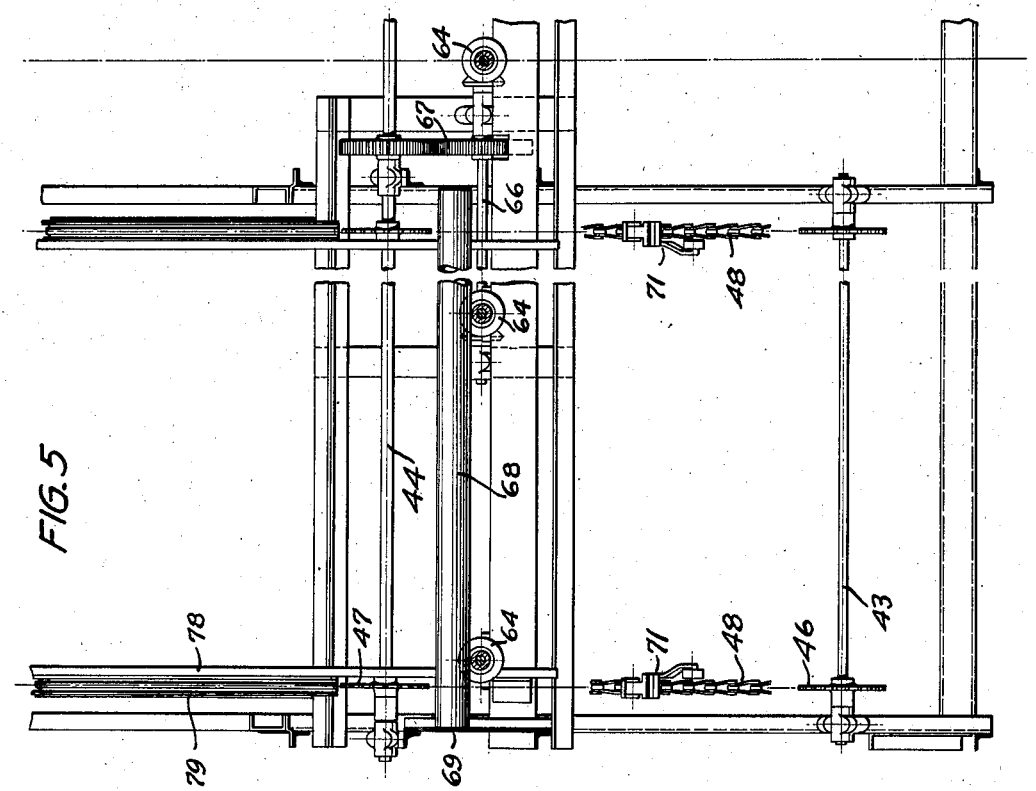
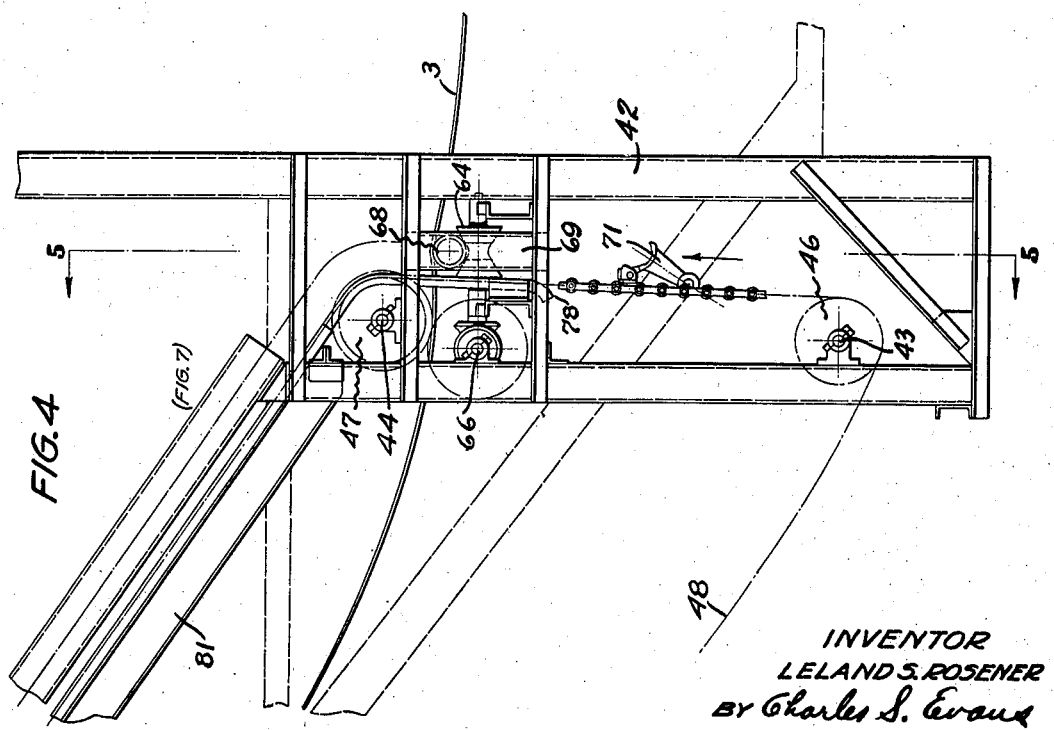
INVENTOR
LELAND S. ROSENER
BY Charles S. Evans
HIS ATTORNEY.

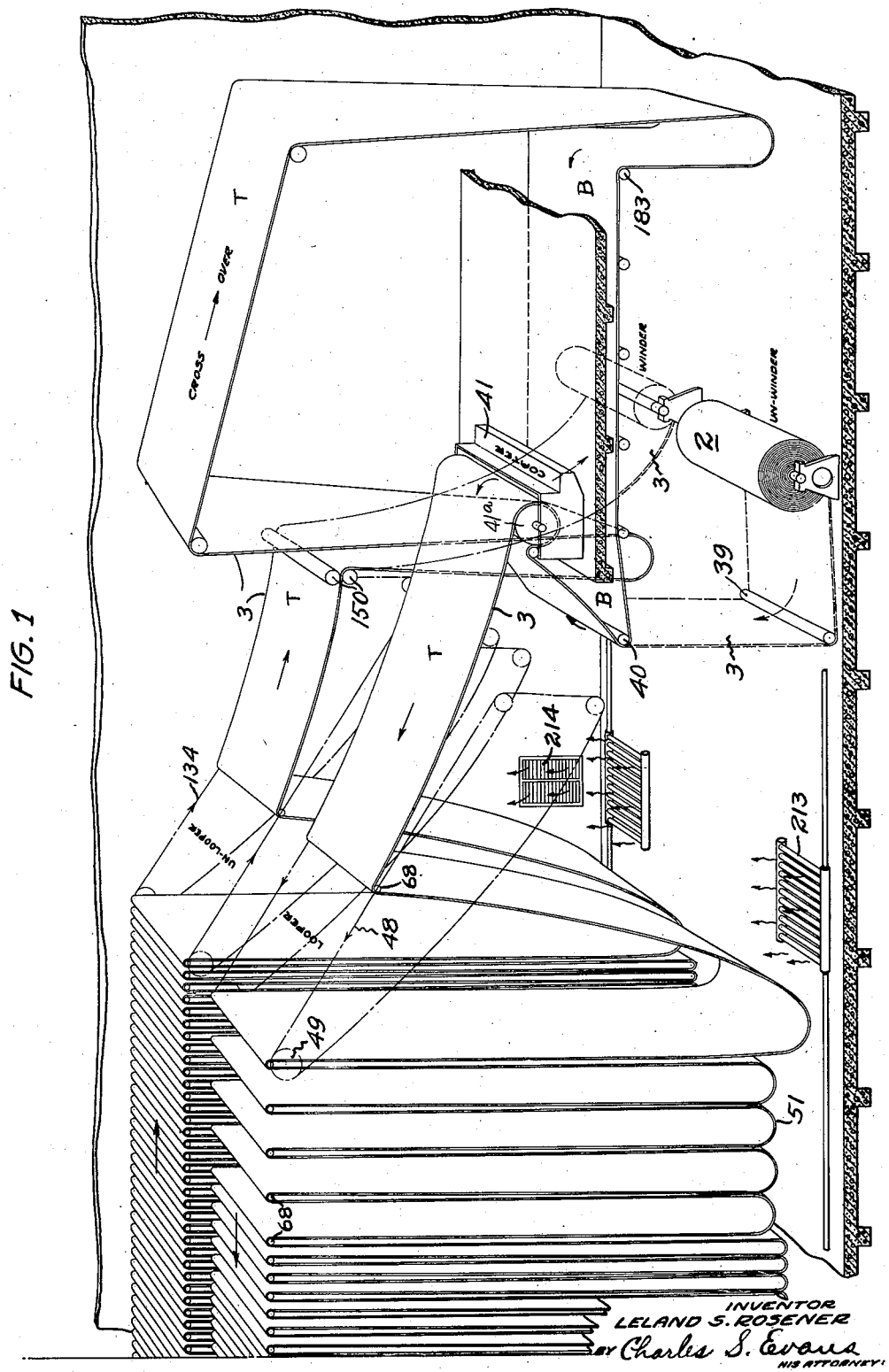

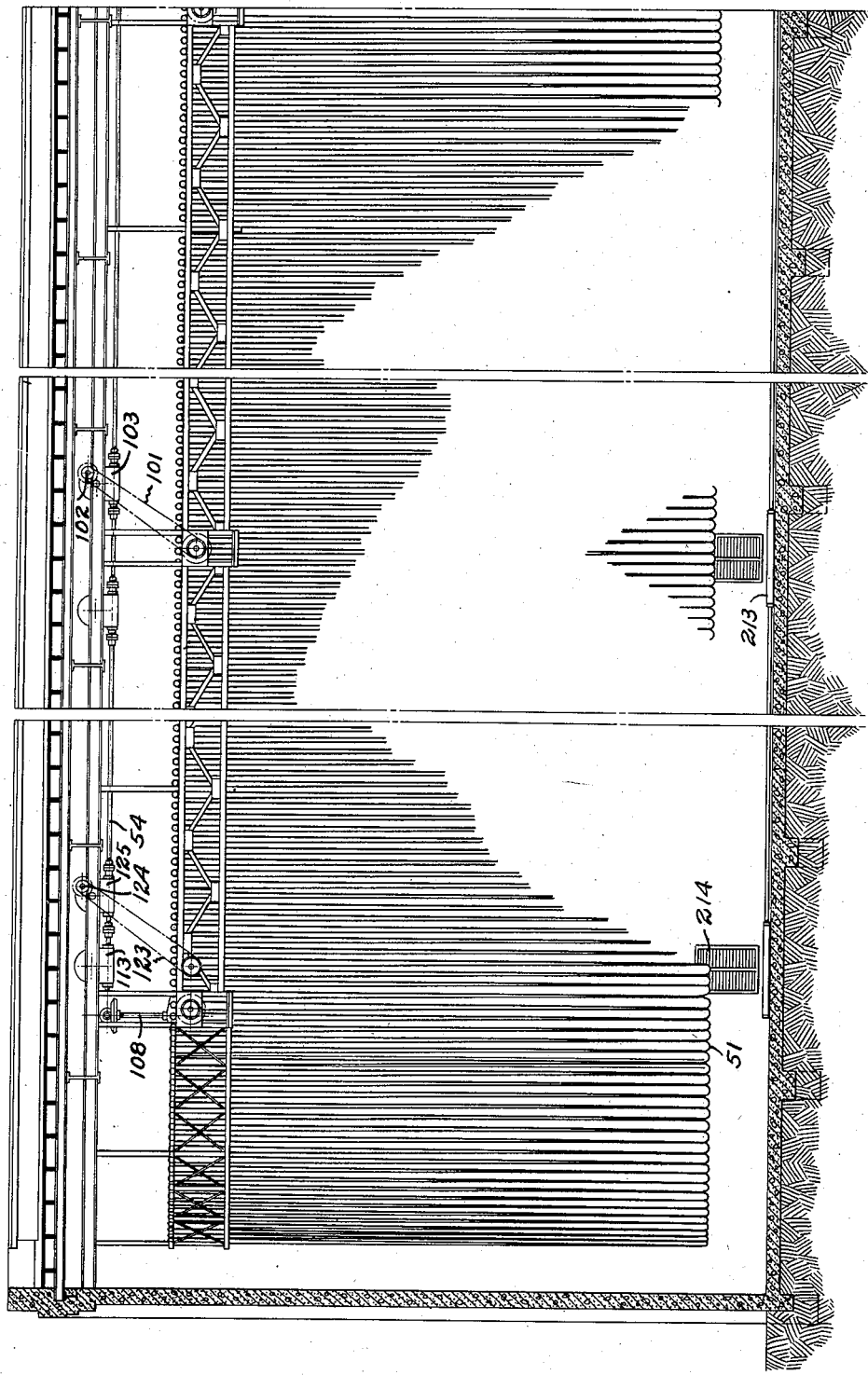

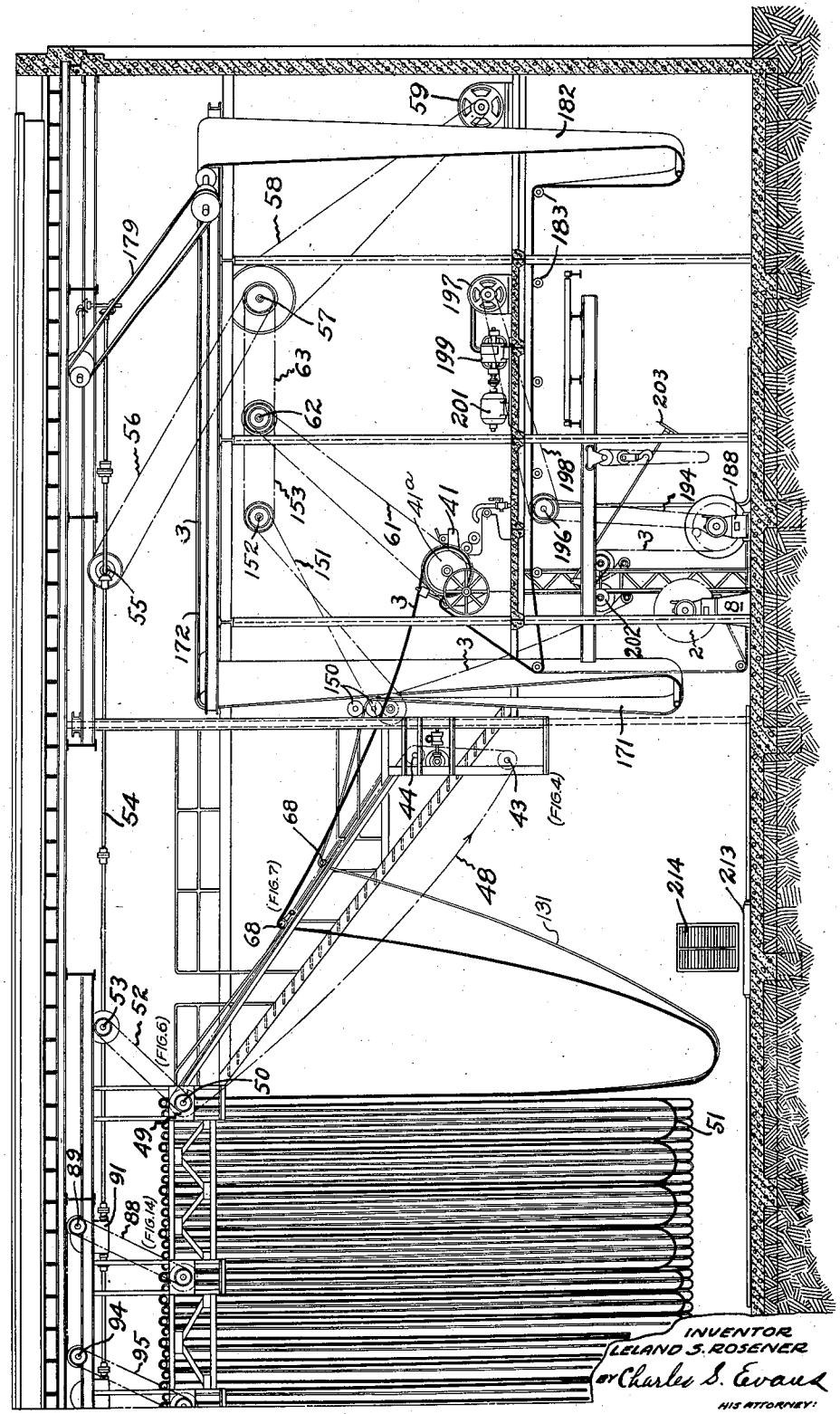

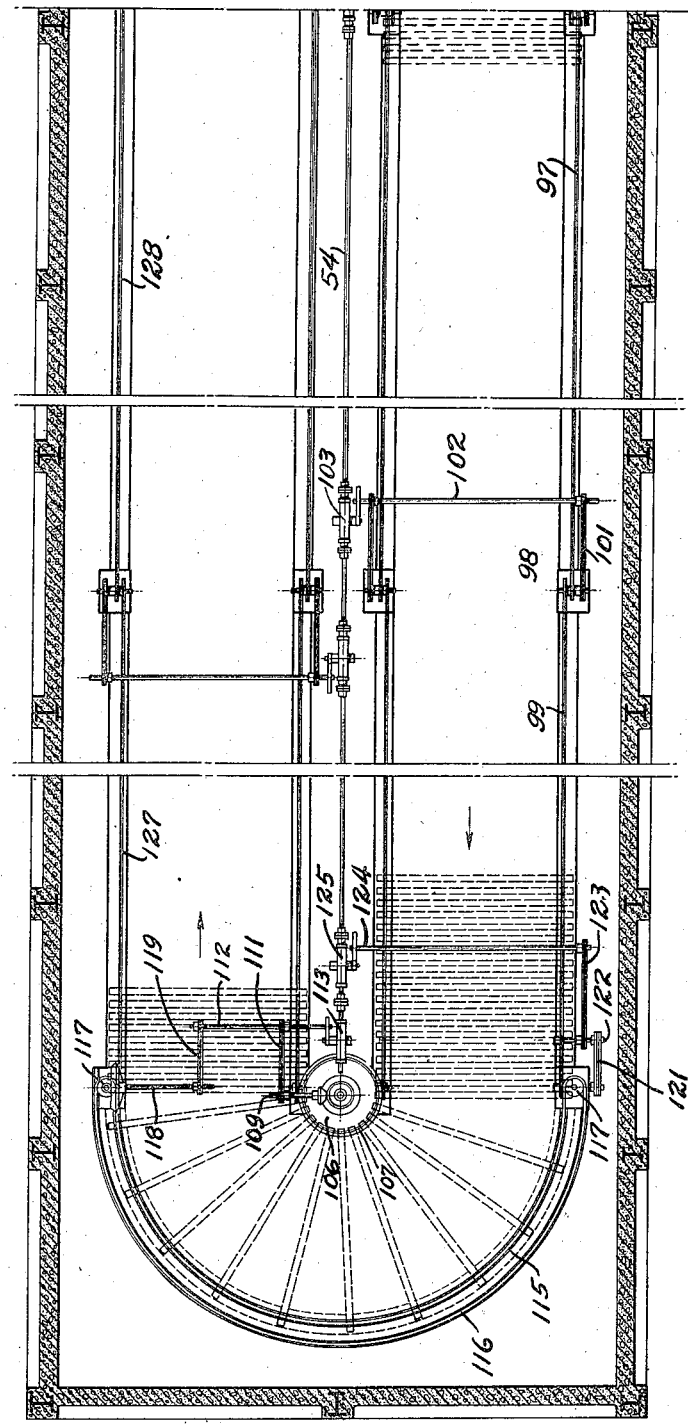

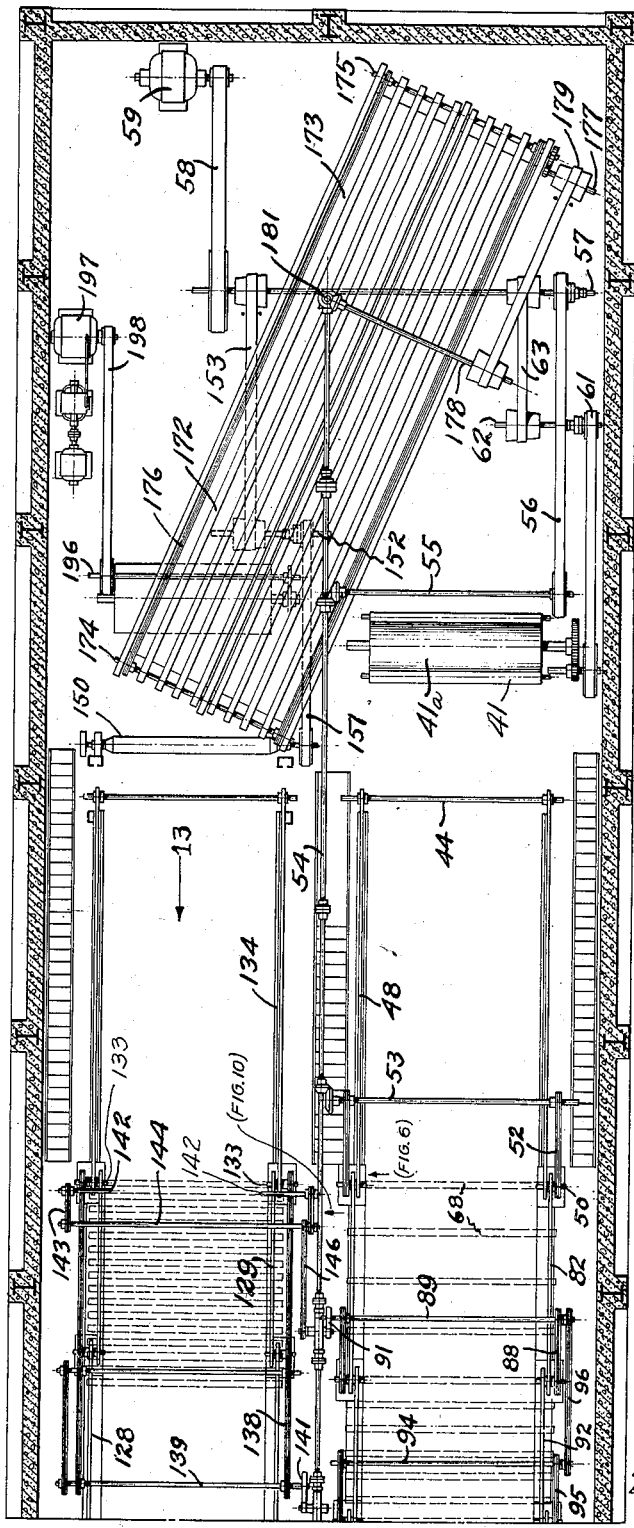

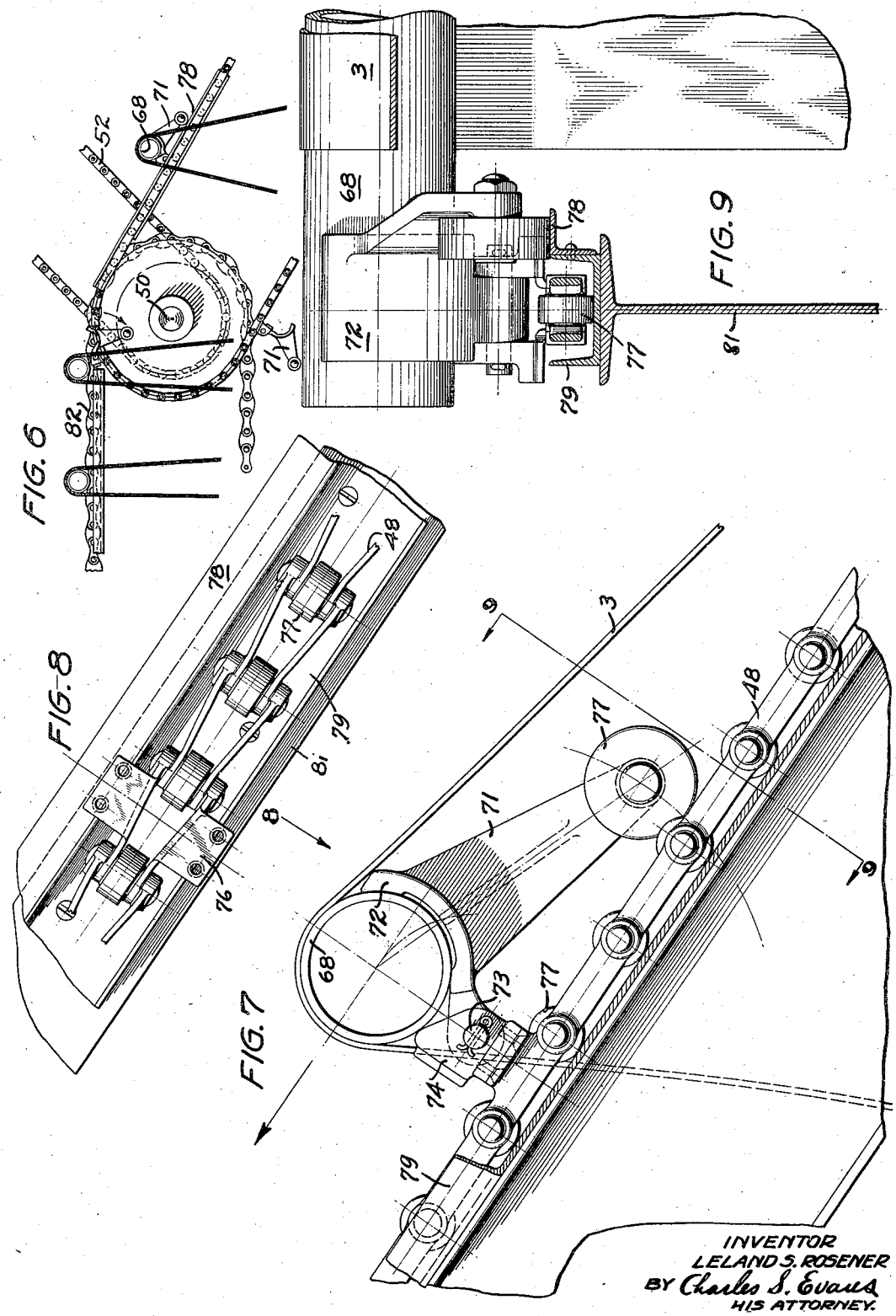

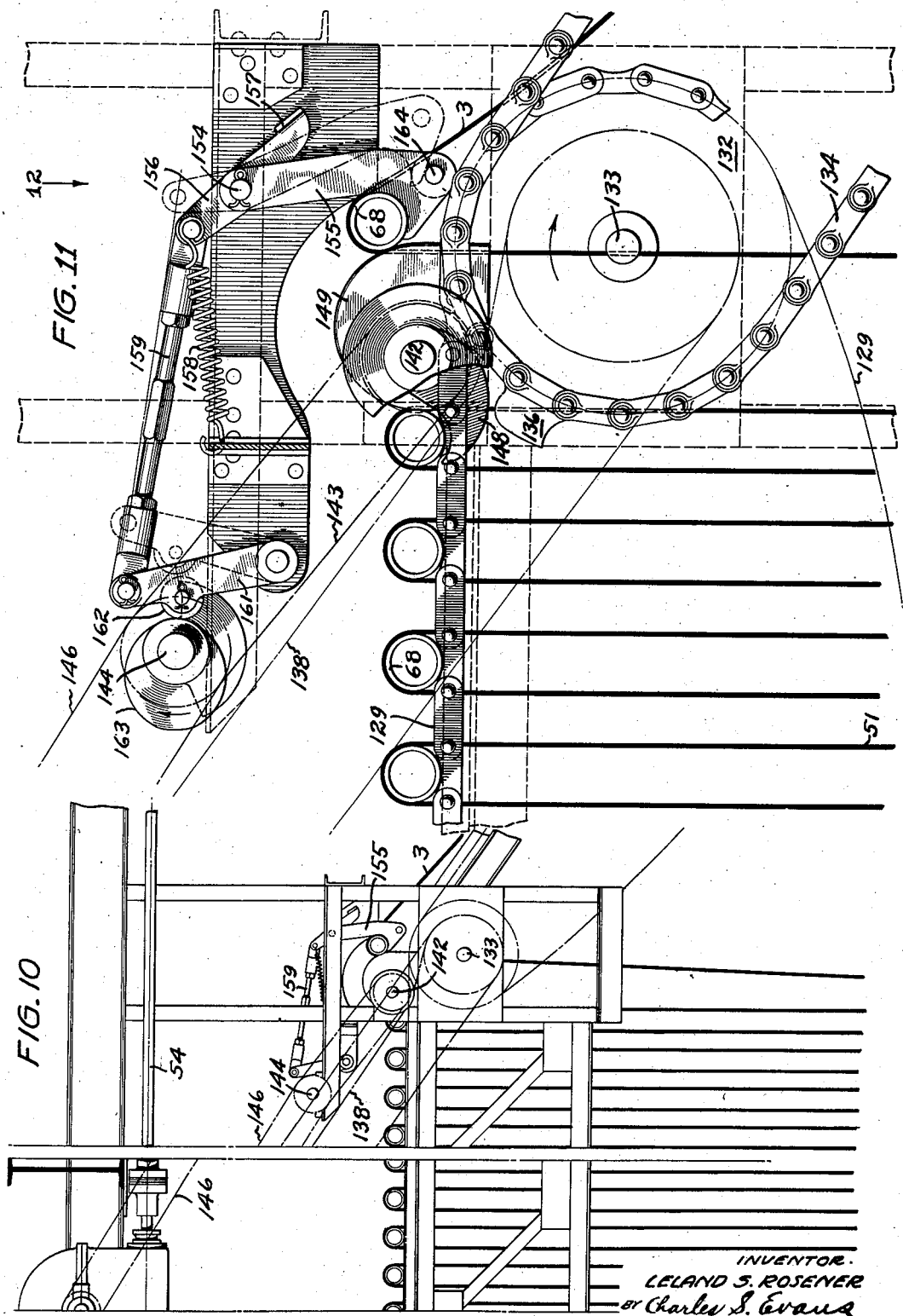

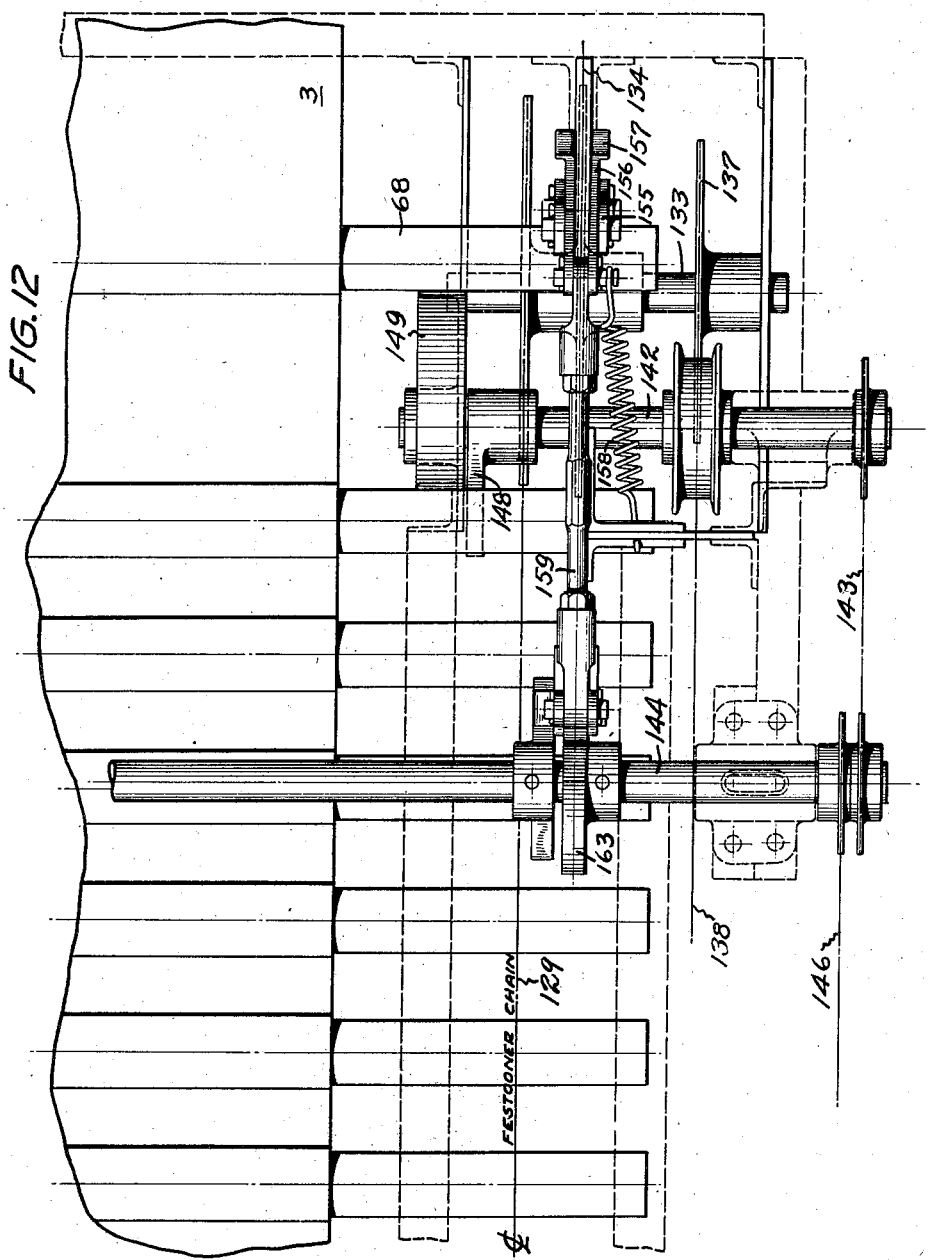

June 10, 1930.  L. S. ROSENER  1,762,243
FESTOONING APPARATUS
Filed March 16, 1926   13 Sheets-Sheet 10

INVENTOR
LELAND S. ROSENER.
BY Charles S. Evans
his ATTORNEY

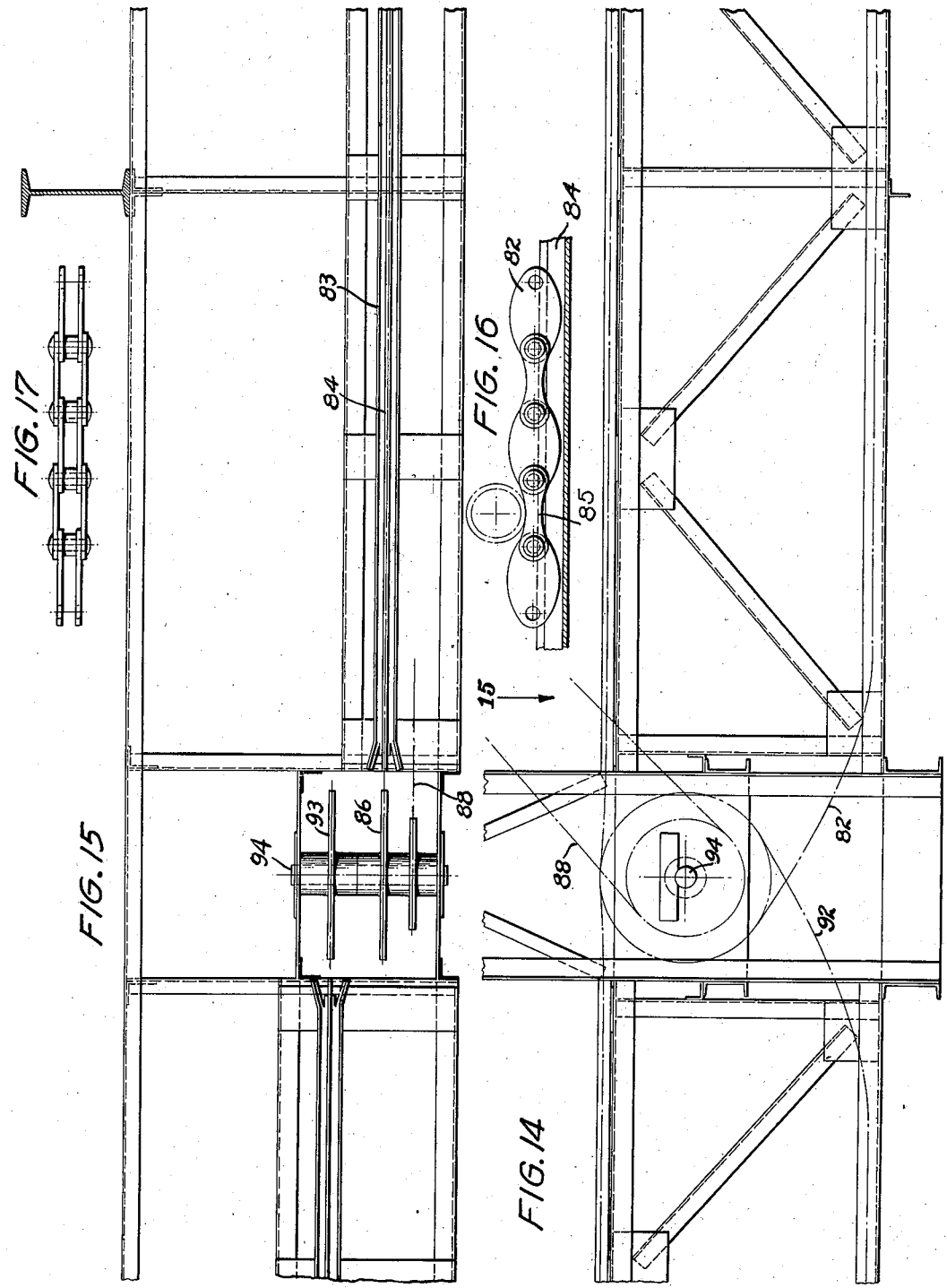

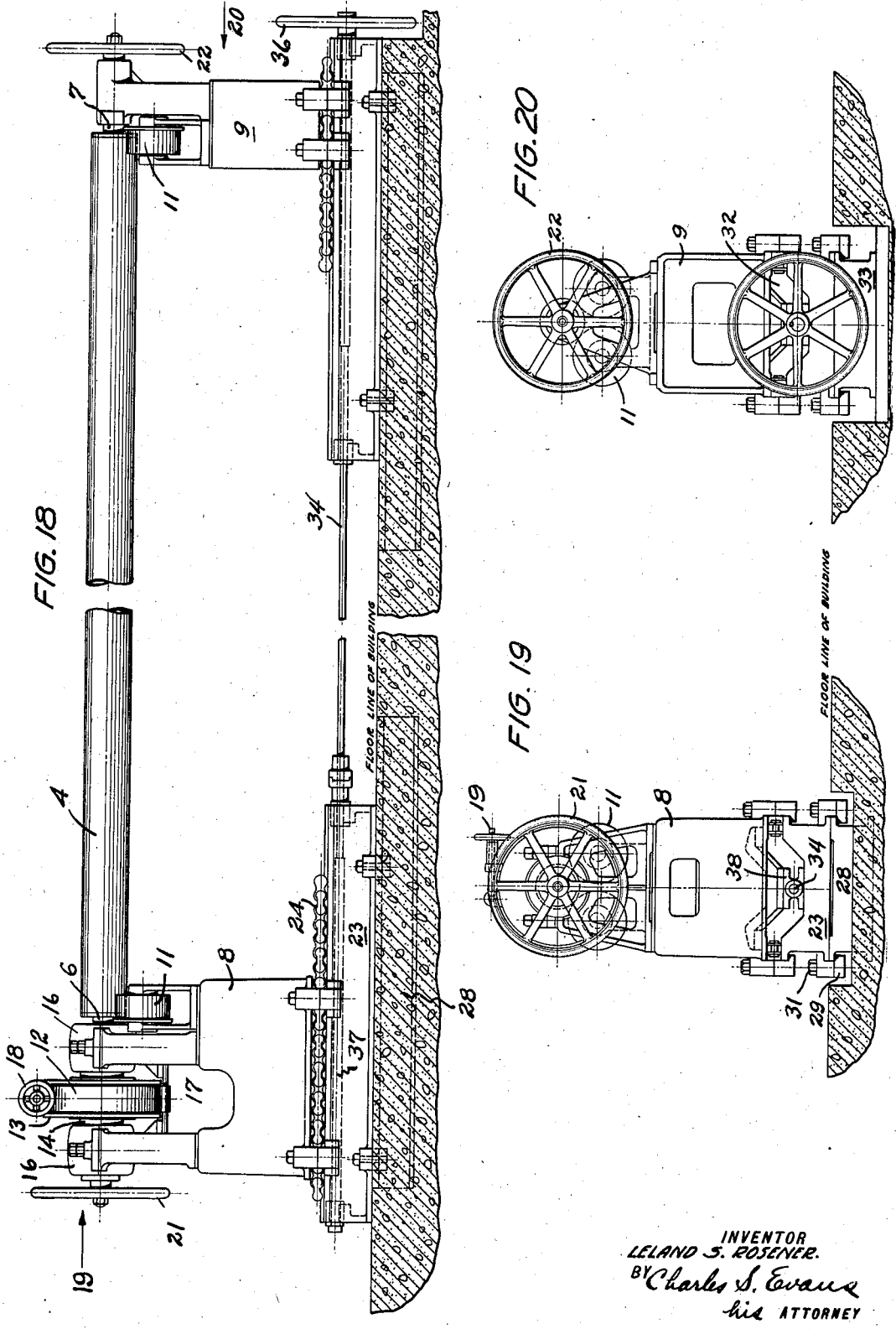

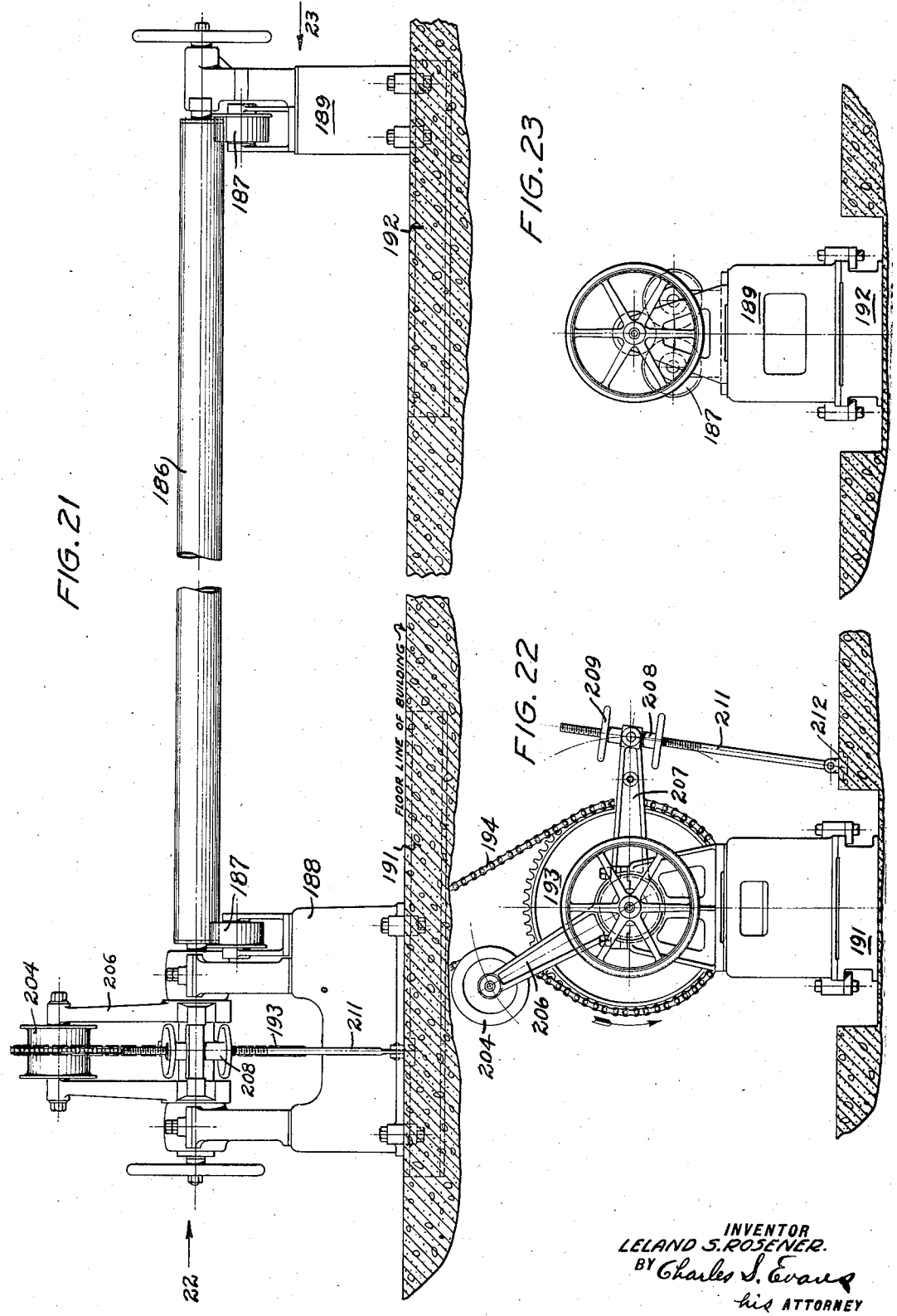

Patented June 10, 1930

1,762,243

UNITED STATES PATENT OFFICE

LELAND S. ROSENER, OF SAN FRANCISCO, CALIFORNIA, ASSIGNOR TO THE PARAFFINE COMPANIES, INC., OF SAN FRANCISCO, CALIFORNIA, A CORPORATION OF DELAWARE

FESTOONING APPARATUS

Application filed March 16, 1926. Serial No. 95,057.

My invention relates to apparatus for handling long webs of fabric such as lengthy strips of floor covering material during the process of its manufacture, and particularly to such an apparatus in which the material is formed in festoons or loops after being coated on one side and while the coating is drying.

One of the objects of the invention is the provision of an apparatus of the class described in which the web may be coated or otherwise treated on one side, and then without rewinding, inverted and passed thru the apparatus a second time to be coated on the other side.

Another object of the invention is the provision of an apparatus of the class described embodying improved loop forming mechanism, improved conveyor means for carrying the loops, improved unlooping means and improved control means.

Another object of the invention is the provision of means for inverting the web and feeding the web thru the treating mechanism a second time without the need of first winding the web into a roll at the end of the first treatment.

Other objects of the invention, together with the foregoing will be set forth in the following description of the preferred embodiment of means for practicing the invention which is illustrated in the drawings accompanying and forming part of the specification. It is to be understood that I do not limit myself to the showing made by the said description and drawings, as I may adopt variations of my preferred form within the scope of my invention as set forth in the claims.
Referring to the drawings:—

Figure 1 is a diagrammatic view in perspective, showing the main portions of the apparatus.

Figure 2 is a side elevation of the apparatus. Because of the great length of the apparatus, the figure is divided into two parts, $2^a$ and $2^b$.

Figure 13:
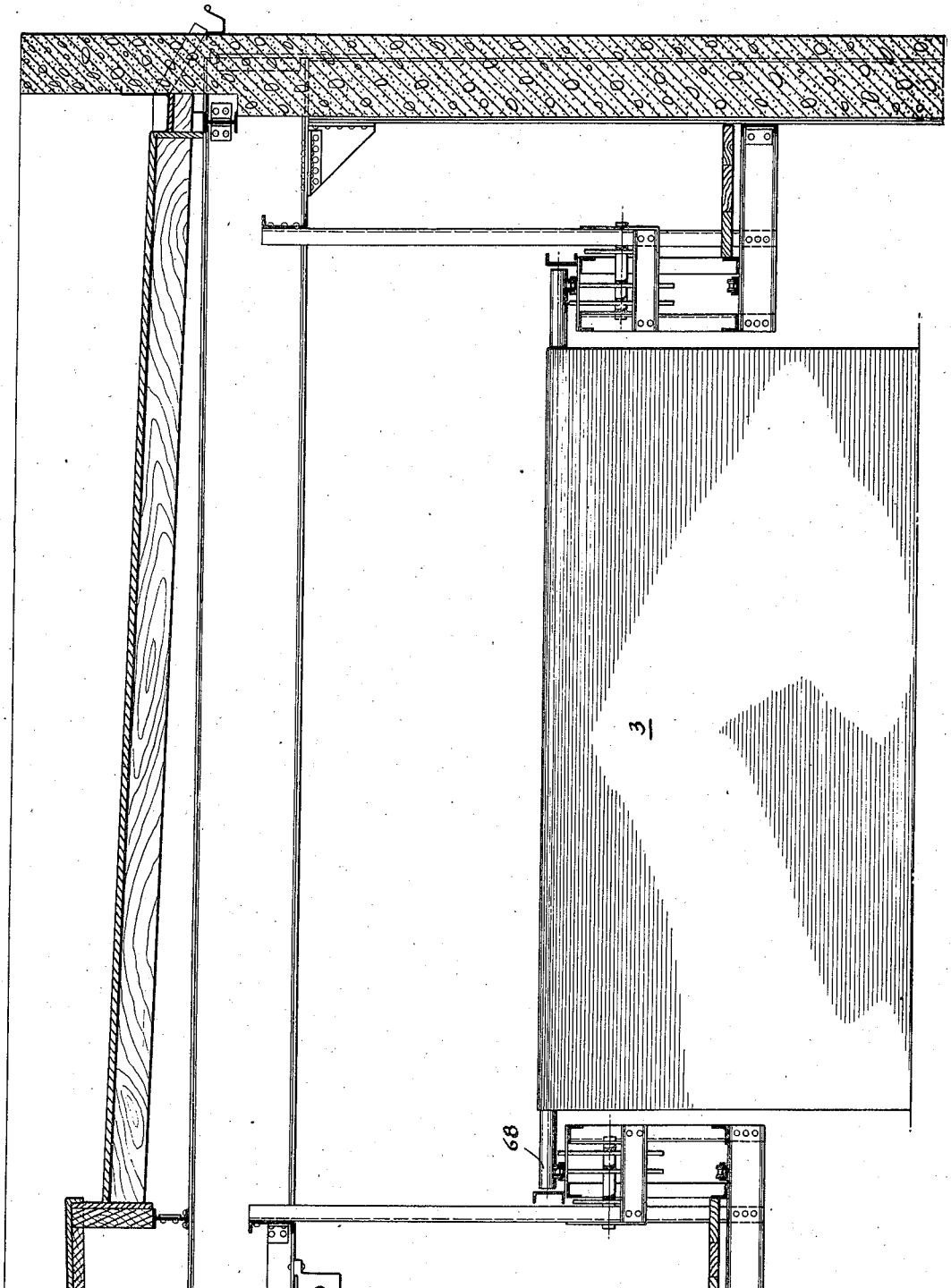

Figure 3, also divided into two parts, $3^a$ and $3^b$, is a plan view of the apparatus.
The web which the apparatus is designed to handle is not shown in this figure, but some of the loop holding bars are shown in dotted lines.

Figure 4 is an elevation of part of the mechanism, shown on a larger scale than in Figure $2^b$.

Figure 5 is an elevation of that part of the mechanism which is shown in Figure 4. The plane of projection is indicated by the line 5—5 of Figure 4.

Figures 6 and 7 are detail views in elevation, showing parts shown in assembly in Figure $2^b$.

Figure 8 is a plan view of a conveyor chain shown in Figure 7. The direction of the view is indicated by the arrow 8 of Figure 7, but the bracket and web shown in Figure 7 are omitted.

Figure 9 is an elevation of the chain and bracket of Figure 7. The plane in which the view is taken is indicated by the line 9—9 of Figure 7.

Figure 10 is a detail in elevation of the unlooper. The position from which the view is taken is indicated in Figure $3^b$.

Figure 11 is similar to Figure 10, but on a larger scale and showing all of the mechanism.

Figure 12 is a plan view of the unlooper shown in Figure 11. The position from which the view is taken is indicated by the arrow 12 of Figure 11.

Figure 13 is an elevation showing a web hanging from one of the supporting bars, and the conveying mechanism and supporting structure on which the bars are carried. The direction of the view is indicated by the arrow 13 of Figure $3^b$.

Figure 14 is an elevation of a part of the mechanism shown in assembly in Figure $2^b$.

Figure 15 is a plan view of the portion shown in Figure 14. The direction of the view being indicated by the arrow 15 in Figure 14.

Figures 16 and 17 are respectively elevation and plan views of one of the conveyor chains. In Figure 16 the chain is shown on the trackway and with one of the loop holding bars indicated in dotted lines thereon.

Figure 18 is a side elevation of that part of the apparatus for mounting and unwinding the supply roll of the web.

Figures 19 and 20 are respectively left and right end views of the unwinder shown in Figure 18.

Figure 21 is a side elevation of that part of the apparatus for winding the treated web into a roll.

Figures 22 and 23 are respectively left and right end views of the winder shown in Figure 21.

In the following description I will describe my invention as embodied in an apparatus for treating or coating a felt base fabric or web during the course of its conversion into a floor covering. One of the steps in the manufacture or floor covering comprises the application of back and face coatings to the felt base. The backing coat provides a finish and protection to the under side of the floor covering, and the face coating provides the foundation on which the pattern of the floor covering is later applied. The fabric from which the floor covering is made usually comprises a sheet or web of felt and for convenience in manufacture is formed in a single strip many hundreds of feet long. It is obviously desirable to coat this web in the strip form and because of the great length of the strip, it is desirable to form the strip into festoons or loops while the coating which has been applied to the upper surface is drying.

Heretofore it has been customary to rewind these loops into a roll, transfer the roll back to the unwinder, and then pass the web through the machine a second time to coat the opposite side. This rerolling of the once coted material and the rehandling of the heavy rolls preparatory to the second coating constitutes a serious loss of time, slowing up the entire operation and adding materially to the cost of production. The apparatus herein described avoids these serious defects.

In my apparatus, a roll of the base felt is mounted adjacent the coating machine thru which the unwinding web may be passed, to apply the desired coating to one side. As the web coated on one side is discharged from the coating machine, it is caught at predetermined intervals by ascending bars which move upwardly on a suitable conveyor to a slowly traveling horizontal conveyor. The bars follow each other into the ascending conveyor and under the web at timed intervals so that loop after loop is evenly formed and the supporting bars deposited on the slowly moving horizontal conveyor.

As the loops are first formed, there is more or less swaying of the pendent material and the supporting bars are therefore positioned on the horizontal conveyor in substantial parallelism and at a sufficient distance apart to prevent the wet surfaces of the hanging loops from touching each other. As the swaying stops however, the bars are transferred to a more slowly moving conveyor, and proceed with the loops quite close together, for some distance from the coating mechanism, meanwhile being subjected to hot air to hasten drying of the coating.

Means are provided for turning the loop-supporting bars bodily thru a half circular path and delivering them to another conveying means which slowly returns them towards the coating machine in a path substantially parallel to the outgoing path. Adjacent the coating machine and unlooping device permits the supporting bars to be dropped down from the now dry web, which then passes over pull rollers as the bars are withdrawn. Means are provided for transferring the bars, after they have left the web, back to the loop-forming mechanism, where they are once more carried up under the freshly issuing web, to form new loops, thus moving in a continuous circuit thru the conveyors of the machine.

After passing over the pull rollers the web drops downwardly in a long loop and then upwardly with a slight twist to a cross-over conveyor, which lies at an angle to the long axis of the machine, and which carries the web into a position so that by means of another long loop in which it again twists slightly, it is brought into substantially vertical alinement with the coating machine, to which it is conducted by suitable rollers. The purpose of the long loop at each end of the cross-over conveyor is to permit the twisting of the web during its transfer from the path in which it is returned toward the coating machine, to an adjacent and parallel path. It will be understood that the web is stiff and heavy and perhaps nine feet wide, and that there is no flexibility transversely in the plane of the sheet.

When the web has moved over into vertical alinement with the web leaving the coating machine it has been inverted relative to the position in which it was first fed thru the coating machine, and may therefore be fed thru the coating machine a second time to receive a coating on the opposite side, then passing thru the loop-forming mechanism onto the conveyor and thru the unlooping mechanism the same as on the first trip thru. Instead of being fed up to the cross-over conveyor however, the doubly coated material is dropped from the pull rollers to a winding mechanism where it is wound into a roll, preparatory to being conveyed to the printing and cutting machines. The rewinding of the web following the application of the first coating, and prior to the application of the second coating upon the opposite side, is thus avoided and the process of coating both sides of the web may proceed as a substantially continuous process, the leading end of the web during the second coating being attached to the tail end of the web during the first coating. It will be understood that in applying the first coating, the apparatus is filled, and as many rolls as necessary to accomplish this are mounted successively in the unwinder, the beginning end of each roll being secured to the end of the preceding roll.

In the apparatus I have illustrated, about 5000 lineal feet of web may be handled at one time. The backing coat requires about four hours to dry and the apparatus is speeded, so that the web reaches the cross-over in about that time. The web from the unwinder is then cut and the leading end attached so that the face coating may be applied on the opposite side. Usually this coating requires a little longer to dry and when the leading end of the web again reaches the unlooper, the working day is at an end and the apparatus is stopped and the web allowed to remain undisturbed over night. The next day the web is severed and winding up of the finished web is started, while a fresh web is connected to follow thru the apparatus for a first coating.

More particularly my festooning apparatus comprises an unwinder shown in Figures 18, 19, and 20, and on which the roll 2, of web 3 is supported and controlled. In the first instance the web of felt base material is wound up upon a mandrel 4 constituted of a heavy piece of metal piping plugged at the ends with blocks having square holes therein in which the spindles 6 and 7 of the head and tail stocks respectively are adapted to seat. The weight of the mandrel and roll is carried by the rollers 11, arranged on the head and tail stocks, but the rotation of the mandrel is controlled by the band brake 12 surrounding the friction drum 13 fixed on the headstock shaft 14, between bearings 16 of the head stock. The band brake is prevented from rotation by engagement with the rod 17, fixed between the bearings, and the tension of the band brake is adjusted by the hand wheel 18 threaded on the spindle 19 passing thru one end of the band brake and pivotally connected to the other end. The spindles 6 and 7 are adjusted axially by the hand wheels 21 and 22 respectively, in accordance with well known practice.

The head stock 8 is slidably mounted on the ways 23, a section of roller chain 24, being interposed between them to facilitate moving the former. The ways 23 are mounted upon the foundation block 28, and these two may be clamped together in desired positions by jaws 29 controlled by the screws 31.

The tail stock 9 is similarly mounted upon the ways 32 and foundation 33, and means are provided for moving both head and tail stocks axially of the mandrel 4 in order to preserve alinement of the unwinding web. Journalled in the ways 23 and 32, is a long shaft 34, having the hand wheel 36 fixed at one of its ends. A portion 37 of the shaft at each end is threaded and engages threaded lugs 38, one of which projects downwardly from each of the head and tail stocks. The threads are in the same direction so that rotation of the hand wheel 36 moves the stocks together in the direction desired, the roller chain 24 under the stocks making the proper bearing in view of the heavy load carried.

From the roll 2 in the unwinder mechanism, the web 3 passes over rollers 39 and 40 and into the coating machine 41, of well-known construction, and preferably arranged on a platform above the unwinder. Since it forms no part of the present invention, it will not be described further than to say that its function is to apply to the surface of the moving web, a coating of the desired material, and that the large roller 41A acts as a guide roller to direct the web into the mechanism. The coating is applied only to one surface at a time and for convenience in Figure 1, I am marking with the character T, the top surface of the web which is coated on the first trip thru the apparatus; and with the character B, the bottom surface which becomes the top surface on the second trip thru the apparatus.

The freshly coated web passes from the coating machine to the loop-forming mechanism. Journalled in suitably arranged framework 42, opposite the coating machine are two horizontal shafts 43 and 44 on each of which are arranged sprockets 46 and 47 respectively which carry a pair of laterally spaced chains 48, which also pass over sprockets 49, each on a stub shaft 50, which as shown in Figures 2$^b$ and 3$^b$, are arranged such a distance above the floor as to give ample space below for the formation of the loops or festoons 51 of the web. The distance between the chains 48 is greater than the width of the web so that the web may hang down between the chains without danger of fouling therewith. Each shaft 50 is driven by a chain 52 from the shaft 53, geared to the line shaft 54 which extends longitudinally above the middle of the entire apparatus. This shaft is geared to the jack shaft 55, Figure 3$^b$, driven by the belt 56 from the jack shaft 57 connected by the belt 58 with a prime mover 59. The coating apparatus 41 is driven by the belt 61 from the jack shaft 62 between which and the jack shaft 57 is arranged a variable speed drive, comprising the belt 63 running over suitable cone pulleys in a well known way. This permits the coating machine to be operated at a speed properly synchronized with the rest of the apparatus.

Extending transversely across the entire apparatus adjacent the shaft 44, over which the chains 48 move, is a series of grooved pulleys 64 suitably geared to a driving shaft 66, which is driven thru the gears 67 by the shaft 44. The function of these grooved rollers is to convey the loop-supporting bars 68, conveniently formed of pieces of round steel pipe, across the face of the machine to a position against the stop plate 69, and then support the bars in that position until picked up by the upwardly moving brackets 71 pivotally mounted on the chains 48.

As best shown in Figures 7, 8 and 9, each bracket 71 comprises a seat 72 on which one end of a supporting bar 68 is adapted to rest. The bracket is pivotally mounted by means of the pin 73 to the block 74, which is fixed on the wings 76, formed at intervals on the links of each chain 48. Moving upwardly as indicated in Figure 4, a pair of the brackets pick up the supporting bar 68 from its position on the rollers 64, stability to each bracket being given by a trailing roller 77, which travels on the track 78, beginning just below the rollers 64 and extending upwardly adjacent the shafts 50. Each track 78, as shown in Figure 9, is mounted on the trackway 79 into which each chain 48 passes immediately after leaving the sprocket wheel 47. The trackways 79 are mounted on the beams 81, forming part of the frame work supports of the apparatus. The brackets on the chains 48 thus provide secure seats for the supporting bars 68, which of course pick up loops of the overlying web as they are carried upwardly.

In Figure 2$^b$, a supporting bar 68 is shown half-way up the inclined trackway. The speed of the chains 48 is synchronized with the speed at which the coating machine delivers the web, and when a supporting bar reaches the sprockets 49 at the top of the chain travel, a loop is complete, and the web between the supporting bar and the coating machine is sagging downwardly upon the next supporting bar which has in the meantime been rolled into place.

As shown in Figure 6 the supporting bars each with a loop depending therefrom, pass from the chains 48 onto a pair of chains 82 of the character shown in Figures 16 and 17. These chains run horizontally along trackways 83, each of which is provided with a central flange 84, which the chain straddles, and on which the rollers of the chain rest. As each supporting bar 68 is carried over the sprockets 49 by the chains 48, it is transferred to the chains 82, each bracket 71 then leaving the trackway 78, so that it drops down out of the way, and starts its backward journey on the lower reach of the chain 48 toward the sprocket 43.

The loop-bearing carrier bar is now positioned on the seats 85 of the chains 82 in the position indicated in dotted lines in Figure 16, and is carried along toward the sprockets 86, over which the far end of each chain 82 passes. Each of these sprockets and the connected chain 82, are driven by the chain 88, from the shaft 89, connected to the line shaft 54 by suitable speed change devices 91. The speed of movement is so arranged that the supporting bars are spaced, say 18 inches apart on the chain 82, so that the loops of web with the freshly applied coating, and which are swaying more or less, are safe from interference with each other. As the swaying stops and the loops hang quietly, it is desirable to space them closer so as to give as great a capacity to the machine as possible; and this is done by transferring the supporting bars to another and similar conveying means comprising the chains 92, the near end of each of which runs over the sprocket 93 (Figure 15) loose on the same shaft which supports the sprocket 86. As the supporting bars leave the chains 83 they pass upon the chains 92 moving at a slower rate, so that the bars are more closely spaced. This relative spacing of the supporting bars is indicated in Figure 3$^b$ by dotted lines representing the bars. The chains 92 are driven in the same manner as the chains 82 being connected to the shaft 94 by the chains 95. The shaft 94 is driven by the chains 96 from the shaft 89.

From the conveyor chains 92 the supporting bars pass to the conveyor chains 97 (Fig. 3$^a$), running over sprockets on the short shafts 98 on which are also sprockets for the conveyor chains 99. These two sets of conveyor chains are both moved at the same speed by the chains 101 connecting shafts 98 and 102, the latter being connected to the line shaft 54 by the speed change devices 103. During their progress along the chains 97 and 99, the supporting bars are spaced as closely together as it is practicable to have them without danger of the wet surfaces of the looped web touching.

Means are provided for bodily turning the supporting bars thru a semi-circular path and delivering them to return conveying means for carrying the bars back toward the coating machine. Disposed on the central line of the apparatus at its end is a turntable 106 (Fig. 3$^a$), having a peripheral flange 107 which is notched in order to provide seats thereon similar to the seats provided by the links of the chain 82. The turntable is arranged in a horizontal plane so as to receive the inner ends of the supporting bars from the inside conveyor chain 99, and is fixed to the vertical shaft 108, connected by suitable gears to the shaft 109, which in turn, is connected by the chain 111 to the jack shaft 112, driven thru suitable speed change devices 113, from the main line shaft 54. In order to carry the outer ends of the supporting bars, a chain 116 is disposed in concentric reaches about sprockets 117. This chain is similar to the other conveyor chains in that it provides seats on the inner reach thereof upon which the outer ends of the supporting bars are transferred from the outside conveyor chain 99. This chain is driven by both sprockets 117, one receiving motion thru the shaft 118 and chain 119 connecting to the shaft 112; and the other sprocket being connected by chain 121, shaft 122 and chain 123 to the shaft 124, driven thru speed change devices 125 from the line shaft.

The chain 115 is moved at a speed such that the supporting bars are maintained in a radial position while being transported thereon, the speed of the turntable 106 at the periphery of the supporting flange 107 being the same as the conveyor 99.

After making the turn at the end of the apparatus the supporting bars are transferred to the conveyor chains 127, and then successively to conveyor chains 128 and 129, on the trip back towards the coating machine. The chains are driven, and the arrangement is the same, as on the outward travel away from the coating machine, with the exception that the spacing of the supporting bars is the same on the return trip. By the time the loops of web reach the end of the conveyor chains 129, they are dry, and it is now necessary to unloop the web and roll it into appropriate rolls for transport to the next stage of manufacture; or to unloop the web, transfer it over into alinement with the coating machine and thus complete the inversion of the web, so that on its next trip thru the coating machine the opposite side may be coated.

In Figure 2$^b$, the web passing from the coating machine over the ascending supporting bar during the formation of the first loop, is shown in heavy lines. Back of the heavy lines are light lines showing the loop on the return conveyor, and also one loop 131 in the process of unlooping. Figure 13 is an elevation showing the web 3 hanging from the supporting bar 68 in the last loop before the supporting bar passes into the unlooper. The position from which the view is taken is indicated by the arrow 13 of Figure 3$^b$.

Means are provided for unlooping the web. Running over sprockets 132 (Figs. 3$^b$, 10 and 11) each on the same shaft 133 with the sprocket for one of the conveyor chains 129, are downwardly extending conveyor chains 134 on which are arranged at suitable intervals seats 136, adapted to support the bars 68, as they are lowered away from the looped web. Because of the magnitude of the various stresses to which the supporting bar is subjected at this point special devices are provided for transferring the supporting bars from the conveyor chains 129 to the conveyor chains 134. These two conveyor chains 129 and 134 are driven from the shafts 133 each of which is provided with the sprocket 137 connected by chain 138 with shaft 139, connected to the line shaft by speed change devices 141.

Arranged on each side is a shaft 142 connected by the chain 143 with the shaft 144, in turn driven by the chain 146, connecting it to the speed reduction device 91. Fixed on each shaft 142 is an arm 148 (Fig. 11) forming a rotary cradle, and this cradle is so timed and proportioned that it picks up the supporting bars 68 as they reach a predetermined point adjacent the end of the conveyor chains 129. Adjacent each end of the cradle, a fixed slideway 149, preferably circular in form, is arranged eccentric to the center of rotation of the shaft 142, and the proportion of parts is such that as the supporting bars 68 are raised on the cradle to the slideways, a short forward movement of the bars on the slideways carries them beyond the end of the cradle arms, which are thereupon free to continue their rotation to pick up another bar.

The web passes from the unlooper between the pull rolls 150 geared together and connected by belt 151 with the jack shaft 152. A speed change device comprising the belt 153 and suitable cone pulleys connects the jack shaft with the shaft 57 so that the speed of the pull rolls may be closely regulated. It will be understood that there is considerable tension on the web between the unlooper and the pull rolls which tends to draw the supporting bars off the slideways 149 and in the direction of the movement of the upper reach of the conveyor chains 134. Means are therefore provided for taking this pull as well as for supporting the weight of the loaded bar, and at the proper moment dropping it into place on the conveyor chains 134 against the seats 136. Pivotally mounted on the pin 154 (Fig. 11) fixed in the frame work on each side, is a hook or latch 155, so formed and positioned that a supporting bar 68 is caught thereon immediately after leaving the cradle arms 148. Also pivotally mounted on each pin 154 is a lever 156, provided with a lug 157 normally held out of engagement with the latch by the spring 158. The levers 156 are however adapted to be moved to position the lugs 157 against the latches so that swinging of the latches when engaged by the supporting bars is prevented.

A link 159 pivotally connects each of the levers 156 to a rock arm 161, also pivotally mounted on the framework and provided with a roller 162, adapted to engage the cam 163, fixed on the shaft 144. The proportion and arrangement of parts is such that the cam rocks the arm 161 to position the lever 156 with the lug 157 blocking any lateral swinging of the latch 155 about its pivot, at the moment when a supporting bar 68 slides into its seat on the latches. As soon as the shock of the transfer is over, rotation of the cams 163 withdraws the lugs 157, so as to leave the latches 155 free to swing, as shown in Figure 11. This freeing of the latches 155, is immediately followed by the engagement of the stops 136, with the lugs 164, on each latch, and the resultant swinging of the latches to drop the supporting bar into a seat on the chains 134 behind the stops 136, after which the supporting bar travels downwardly on the upper reach of the conveyor chains 134, the loop gradually flattening out as indicated in Figure 2ᵇ. As the supporting bar nears the bottom, it frees itself from the web, and is deposited on the rollers 64 which at once convey it across to a position against the stop 69. The bar thus completes a circuit of the machine and lies in position to be again picked up on the brackets 71.

From the pull rolls 150, the web passes downwardly in a long loop 171 and then upwardly twisting slightly to the cross-over conveyor comprising a plurality of closely spaced belts 172 (Fig. 3ᵇ) running over a light flooring 173. The belts are carried on pulleys fixed on the shafts 174 and 175 at each end of the flooring and these shafts are also connected on each side by the chains 176. One of the shafts is connected by a suitable gearing to a shaft 177 between which and the shaft 178 is arranged a conventional speed change device comprising the belt 179 and suitably arranged cone pulleys, so that the speed of the cross-over conveyor may be accurately synchronized with the rest of the apparatus. The shaft 178 is connected by a suitable gearing 181 to the line shaft 54.

It will be noted that the cross-over conveyor as shown in Figure 3ᵇ is arranged so that receiving the web opposite the end of the unlooper, it delivers the web at a point opposite the coating mechanism. The web drops from the end of the cross-over conveyor in a long loop 182 twisting slightly like the loop 171, and passing forwardly over the guide rollers 183 to a point, vertically alined with the coating machine. At this point, the coated surface is down, that is, the web is inverted relative to the coating machine. The web may now be broken as it comes from the supply roll 2 and the end of the already coated web secured to the tail end of the piece in the machine so that the web starts a second time thru the coating apparatus, but this time presenting the opposite side for treatment. The inversion of the web is a result of three manipulations in the apparatus; first, the bodily turning on the conveyor 115 and turntable 106, and second, the transfer of the web on the cross-over conveyor, and third, its inversion over the guide rolls 183. This sequence of operations results in presenting the opposite side of the web to the treatment of the coating machine on the second trip therethru, so that both sides of the web may be coated by running the web continuously thru the machine twice.

As the doubly coated web reaches the unlooper on its second trip thru the machine, it is unlooped and the severed end carried to a winder mechanism with which it is wound up into a roll for convenient handling.

When the web is to be wound up into a roll the continuity of the web is broken and the end carried from the pull rolls 150 down to the winder mechanism illustrated in Figures 21, 22 and 23, where it is wound up upon the mandrel 186 which is supported on the rollers 187, in the head stock 188 and tail stock 189. The head and tail stocks are mounted on foundation blocks 191 and 192 respectively set in the concrete flooring of the building, and their construction is substantially the same as that already explained in connection with the unwinder shown in Figure 18, except that in place of the friction drum, the head stock shaft is provided with a driving sprocket 193 connected by the chain 194, with the jack shaft 196, driven from the direct current motor 197 by the belt 198.

The motor 197 receives current from the generator 199 directly connected to the alternating current motor 201, the motor and generator forming part of the well known Ward-Leonard system of speed control. It is of course necessary to very carefully control the speed of the winding mandrel 186 so that the web is wound at the same rate of speed it is delivered from the unlooper.

In order to properly tension the web as it passes from the pull rollers 150 to the winder, tension rollers 202 (Fig. 2ᵇ) are provided, one of them having a brake band controlled by the handwheel 203.

In order to permit axial movement of the head stock 188, as occasion may require, means are provided for slackening off the idler pulley 204 over which the chain 194 runs. The idler pulley 204 is mounted on the end of the arm 206 pivoted on the axis line of the head stock, and carrying the arm 207 on which the nut 208 is pivoted. The nut is provided with the hand wheel 209 and is threaded on the shaft 211, the other end of which is pivotally connected to a block 212 fixed on the floor. Movement of the nut on the shaft swings the arm 206 and the pulley 204 to loosen or tighten the chain as occasion may require.

The room in which the apparatus is arranged is preferably heated, to promote the drying of the coatings, by steam coils 213, and air is admitted to the room thru the shuttered opening 214.

I claim:

1. In a machine for treating a web, a guide roll over which said web is passed and repassed and means for inverting the position of the web on said roll between successive passages thereover.

2. In a machine for treating a web, a treating mechanism, means for feeding the web to the treating mechanism, translationally movable means for carrying the web away from said treating mechanism, and means for inverting the web and returning the inverted web to the treating mechanism.

3. In a machine for treating a web, a treating mechanism, means for feeding the web to the treating mechanism, translationally movable means for carrying the web away from the treating mechanism, and means for inverting the web and returning it to the treating mechanism in substantially vertical alinement with the web leaving the treating mechanism.

4. In a machine for treating a web, a treating mechanism, means for feeding the web to the treating mechanism, translationally movable means for carrying the web away from the treating mechanism, carrier means for reversing the direction of travel of the web, means for carrying the web back toward the treating mechanism, and means for feeding the web back to the treating mechanism in substantially vertical alinement with the web leaving the treating mechanism.

5. In a machine for treating a web, a treating mechanism, means for feeding the web to the treating mechanism, translationally movable means for carrying the web away from the treating mechanism, carrier means for reversing the direction of travel of the web, means for carrying the web back toward the treating mechanism in substantially horizontal alinement with the outwardly moving web, and means for feeding the web back to the treating mechanism in substantially vertical alinement with the web leaving the treating mechanism.

6. In a machine for treating a web, a treating mechanism, means for feeding the web to said treating mechanism, means for forming loops of the treated web, means for carrying the looped web away from said treating mechanism, means for successively varying the distance between the loops, and means for inverting the web and returning the inverted web to the treating mechanism.

7. In a machine for treating a web, a treating mechanism, means for feeding the web to said treating mechanism, means for forming loops of the treated web, means for carrying said loops away from said treating mechanism, carrier means for reversing the direction of travel of the loops, means for carrying the loops back toward the treating mechanism, means for unlooping the web, and means for feeding the web back to the treating mechanism.

8. In a machine for treating a web, a treating mechanism, means for feeding the web to the treating mechanism, means for carrying the web away from the treating mechanism, and means for returning the web to the treating mechanism in inverted position.

9. In a machine for treating a web, a treating mechanism, means for feeding the web to the treating mechanism, means for carrying the web away from the treating mechanism, and optional means for winding the web into a roll or returning the web to the treating mechanism in inverted position.

10. In a machine for treating a web, a treating mechanism, means for feeding the web to said treating mechanism, means for forming loops of the treated web including a plurality of bars on which said loops are formed, means for carrying said bars away from the treating mechanism, means for returning said bars toward the treating mechanism, means for transferring the bars from the outgoing carrier to the returning carrier, means for removing the web from the bars, and means for returning the web to the treating mechanism.

11. In a machine for treating a web, a treating mechanism, means for feeding the web to said treating mechanism, means for forming loops of the treated web, including a plurality of bars on which said loops are formed, means for carrying said loops away from the treating mechanism, means for returning said loops toward the treating mechanism, means for transferring the loops from the outgoing carrier to the returning carrier, and means for removing the web from the bar.

12. In a machine for treating a web, a treating mechanism, means for feeding the web to said treating mechanism, means for forming loops of the treated web, including a plurality of bars on which said loops are formed, means for carrying said bars away from the treating mechanism, means for returning said bars toward the treating mechanism, means for transferring the bars from the outgoing carrier to the returning carrier, means for removing the web from the bars, means for returning the web to the treating mechanism, and means for shifting the freed bars into the loop-forming means.

13. In a machine for treating a web, a treating mechanism, means for feeding the web to said treating mechanism, means for forming loops of the treated web, including a plurality of bars on which said loops are formed, means for carrying said bars away from the treating mechanism, means for returning said bars toward the treating mechanism, means for transferring the bars from the outgoing carrier to the returning carrier, means for removing the web from the bars, means for shifting the freed bars into the loop-forming means, and optional means for winding the web into a roll or returning the web to the treating mechanism.

14. In a machine for treating a web, a treating mechanism, means for feeding the web to said treating mechanism, means for forming loops of the treated web, including a plurality of bars on which said loops are formed, means for carrying said loops away from the treating mechanism, means for returning said loops toward the treating mechanism, means for transferring the loops from the outgoing carrier to the returning carrier, means for removing the web from the bars, and means for shifting the freed bars to the loop-forming means.

15. In a machine for treating a web, a treating mechanism, means for feeding the web to said treating mechanism, means for forming loops of the treated web, including a plurality of bars on which said loops are formed, a plurality of carriers successively receiving said loop-holding bars to convey the looped web thru a path ending adjacent its beginning, means for unlooping the web from the bars, and means for shifting the freed bars from the unlooper to the looper.

16. In a machine for treating a web, a treating mechanism, means for feeding the web to said treating mechanism, means for forming loops of the treated web, including a plurality of bars on which said loops are formed, carrier means for conveying the loop-holding bars, means for unlooping the web from the bars, and means for returning the web to the treating mechanism.

17. In a machine for treating a web, a treating mechanism, means for feeding the web to said treating mechanism, means for forming loops of the treated web, including a plurality of bars on which said loops are formed, carrier means for conveying the loop-holding bars thru a path ending adjacent its beginning, means for unlooping the web from the bars, and optional means for winding the web into a roll or returning the web to the treating mechanism in inverted position.

18. In a machine for successively treating opposite sides of a web, a treating mechanism, translationally movable means for carrying the web away from the treating mechanism, means for reversing the direction of travel of the web and returning the web toward the treating mechanism while maintaining the same relative positions of the upper and lower surfaces of the web, and means for inverting the web and feeding it back to the treating mechanism.

19. In a machine for treating a web, a drum from which the web is fed, a pair of endless chains between which the web may pass, brackets on said chains and adapted to hold loop-holding bars, grooved rollers for conveying bars below said web into the path traversed by said brackets, and means for halting said bars in position to be caught by and evenly disposed on companion brackets.

20. In a machine for treating a web, a drum from which the web is fed, a pair of endless chains between which the web may pass, brackets on said chains and adapted to hold loop-holding bars, carrier means for conveying bars into the path traversed by said brackets and below the web, conveying means having seats thereon to which the loop-holding bars are transfered, a guide roller over which the web passes, a second pair of endless chains disposed between the conveying means and the carrier means, brackets on said second chains to receive the loop-holding bars from the conveying means as the web passes over said guide roller and deposit the freed bars on the carrier means, and means for synchronously driving the chains and conveying and carrier means.

21. In a machine for handling bars, a conveyor for carrying a succession of bars, a second conveyor, a cradle to receive the bars and interposed between the conveyors, means for moving the cradle to pick up the bars from the first conveyor and release them, a latch for catching the released bars, and means acting in time with the second conveyor for withdrawing the latch to permit the bars to seat on the second conveyor.

22. In a machine for handling bars, a conveyor for carrying a succession of bars, a second conveyor, a fixed slideway between the conveyor, means for lifting the bars from the first conveyor to the slideway, a latch for holding the bars on the slideway, and means acting in time with the second conveyor for withdrawing the latch.

23. In a machine for handling bars, a conveyor having seats for carrying a succession of bars, a shaft having arms thereon upon which the bars may be cradled, means acting in time with the movement of the first named conveyor for rotating the shaft to lift the bars from the conveyor, a slideway fixed to receive the bars from the arms, a latch for holding the bars on the slideway, a second conveyor, and means acting in time with the second conveyor for withdrawing the latch to permit the bars to fall thereon.

24. In a machine for handling bars, a conveyor having seats for carrying a succession of bars, a shaft having arms thereon upon which the bars may be cradled, means acting in time with the movement of the first named conveyor for rotating the shaft to lift the bars from the conveyor, a slideway fixed to receive the bars from the arms, a latch for holding the bars on the slideway, cam operated means timed with said shaft for moving said latch to holding position, a second conveyor, and means acting in time with the second conveyor for withdrawing the latch to permit the bars to fall thereon.

25. In a machine for handling bars, a conveyor having seats for carrying a succession of bars, a shaft having arms thereon upon which the bars may be cradled, means acting in time with the movement of the first named conveyor for rotating the shaft to lift the bars from the conveyor, a slideway fixed to receive the bars from the arms, a latch for holding the bars on the slideway, cam operated means timed with said shaft for fixing said latch in holding position until the bars have come to rest thereagainst, a second conveyor, and means acting in time with the second conveyor for withdrawing the latch to permit the bars to fall thereon.

26. A carrier for a looped web comprising a plurality of bars for holding the loops of said web, a turntable for engaging one end of said bars, means concentric with said turntable for engaging the other end of said bars, and means for driving said turntable and said concentric means in angular synchronism.

27. A carrier for a looped web comprising a plurality of bars for holding the loops of said web, a turntable for engaging one end of said bars, means concentric with said turntable for engaging the other end of said bars, means for driving said turntable and said concentric means in angular synchronism, means for delivering said bars to said turntable and said concentric means, and means for receiving said bars therefrom.

28. A carrier for a looped web comprising a plurality of bars for holding the loops of said web, a turntable having notches formed thereon for engaging one end of said bars, and a chain disposed in concentric reaches about said turntable for engaging the other end of said bars.

29. In a loop forming mechanism, a plurality of bars for receiving the loops, a pair of upwardly moving chains spaced to engage the ends of said bars, brackets pivotally mounted on said chains for receiving and carrying said bars, and means for holding said brackets in position to carry the bars and releasing said brackets to discharge said bars.

30. In a loop forming mechanism, a plurality of bars for receiving the loops, a pair of upwardly moving chains spaced to engage the ends of said bars, brackets pivotally mounted on said chains for receiving and carrying said bars, tracks disposed adjacent said chains, and means on said brackets for engaging said tracks to hold the bracket in position to retain the bars.

31. In a loop forming mechanism, a plurality of bars for receiving the loops, a pair of upwardly moving chains spaced to engage the ends of said bars, brackets pivotally mounted on said chains for receiving and carrying said bars, a track disposed adjacent said chains, and trailing rollers on said brackets for engaging said track.

32. In a mechanism for handling a looped web, a plurality of bars for receiving the loops, an upwardly moving conveyor for raising said bars, a downwardly moving conveyor for lowering said bars, and a plurality of grooved pulleys for transferring the bars from one conveyor to the other.

In testimony whereof, I have hereunto set my hand.

LELAND S. ROSENER.